United States Patent [19]

Carey et al.

[11] Patent Number: 4,489,380
[45] Date of Patent: Dec. 18, 1984

[54] WRITE PROTECTED MEMORY

[75] Inventors: Richard A. Carey, Ashland; Jerry Falk, Medway, both of Mass.

[73] Assignee: Honeywell Information Systems Inc., Waltham, Mass.

[21] Appl. No.: 364,381

[22] Filed: Apr. 1, 1982

[51] Int. Cl.³ .............................................. G06F 13/00
[52] U.S. Cl. ...................................................... 364/200
[58] Field of Search ... 364/200 MS File, 900 MS File

[56] References Cited

U.S. PATENT DOCUMENTS 4,298,934 11/1981 Fischer ................................. 364/200

Primary Examiner—Raulfe B. Zache

Attorney, Agent, or Firm—George Grayson; Nicholas Prasinos

[57] ABSTRACT

An interactive terminal includes a central processor unit (CPU) having a microprocessor and a random access memory (RAM). Signals from the microprocessor place the RAM in a write protect mode. If the RAM receives a write instruction from the microprocessor when the RAM is in the write protect mode, then an illegal condition is indicated and a nonmaskable interrupt is generated to allow the terminal to recover. When the RAM is in the write protect mode, signals from the microprocessor restore the RAM to its normal read/write mode.

3 Claims, 3 Drawing Figures

WRITE PROTECTED MEMORY

RELATED APPLICATION

The following U.S. patent application filed on an even date with the instant application and assigned to the same assignee as the instant application is related to the instant application and is incorporated herein by reference.

"Apparatus for Microprocessor Address Bus Testing" by Richard A. Carey, filed on Apr. 1, 1982 and having U.S. Ser. No. 364,382.

BACKGROUND OF THE INVENTION

1. Field of the Invention

This invention relates generally to an interactive terminal computing system, and more particularly to a means for generating a nonmaskable interrupt when a central processor unit attempts to write into a memory which is in a write protect mode.

2. Description of the Prior Art

Many computing systems including terminal systems have a number of subsystems coupled to a central processor unit (CPU) which includes a microprocessor. A subsystem desiring to communicate with another subsystem sends a signal to the CPU requesting an interrupt, The CPU processes the interrupt by branching to a particular firmware routine to process the interrupt. A distinct interrupt vector for each subsystem is stored in a memory and points to the starting address of the firmware routine.

Typical systems are described in U.S. Pat. No. 4,240,140 entitled "CRT Terminal Priority Interrupt Apparatus for Generating Vectored Addresses" and in U.S. Pat. No. 4,255,786 entitled "Multi-Way Vectored Interrupt Capability".

The vectored interrupt controls the overall system operation; however, if any of the interrupt vectors stored in memory are changed either deliberately or inadvertently, then the system may "crash".

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

It is accordingly a primary object of the invention to provide for an improved operation of an interactive terminal system.

It is an object of the invention to provide an improved central processor unit.

It is another object of the invention to provide a central processor unit having an improved memory system.

It is still another object of the invention to provide a memory system which is operative in a write protect mode.

It is yet another object of the invention to provide a memory system which calls for a nonmaskable interrupt when the system tries to write into memory when the memory is in a write protect mode.

SUMMARY OF THE INVENTION

An interactive terminal includes a central processor unit (CPU) and a number of subsystems which communicate with each other over a system bus under control of the CPU. The CPU includes a random access memory (RAM) for storing the interrupt vectors and programs for processing the interrupts.

The RAM is operative on a read or write operation, when not in the write protect mode. In the write protect mode, the information can only be read from the RAM. An attempt to write into the RAM causes a nonmaskable interrupt (highest priority interrupt). A microprocessor is responsive to a nonmaskable interrupt signal to branch to a corrective program.

The microprocessor generates signals to put the RAM into the write protect mode by setting a write protect flop. The RAM remains in the write protect mode until the microprocessor generates signals to reset the write protect flop. If the microprocessor generates a RAM write signal when the RAM is in the write protect mode, then a signal is stored in a nonmaskable interrupt flop and results in a nonmaskable interrupt signal being received by the microprocessor.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
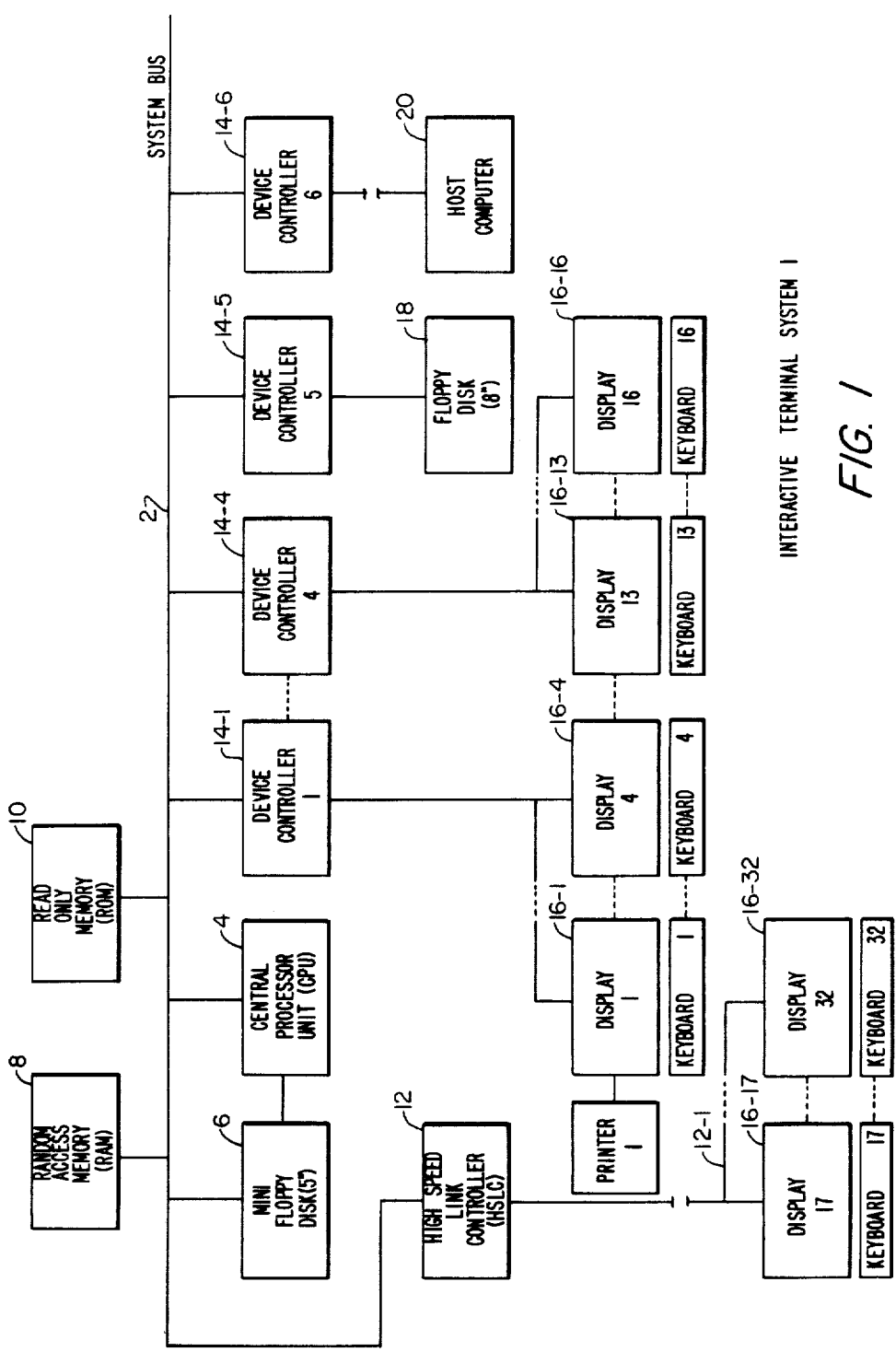
FIG. 1 shows a block diagram of the interactive terminal system.

FIG. 1 shows a block diagram of a typical multi-application interactive terminal system 1. Operators seated at work stations may input information into the system via keyboards and receive requested information from the system via cathode ray tube (CRT) displays. A work station includes a keyboard and a display, and a printer if required by the application. The typical system of FIG. 1 has 32 work stations, display 1 and keyboard 1 16-1 through display 32 and keyboard 32 16-32. Note that printer 1 is included in the work station 16-1. Four work stations are coupled to each device controllers 14-1 through 14-4 for a total of 16 work stations, and 16 work stations are coupled to a high speed link controller (HSLC) 12. The HSLC 12 eases the connection of work stations by "dropping" them from a cable 12-1.

An 8 inch floppy disc 18 stores data pertinent to the application for which system 1 is used. As an example, when system 1 is used in a financial application, the floppy disc 18 may store information about customer accounts and recent transactions prior to transmission to the host. Floppy disk 18 is coupled to disk controller 14-5.

A host computer 20 may couple system 1 to a communication network for enabling communication with other terminal systems or other host computers in the network. Host computer 20 is coupled to device controller 14-6.

Device controllers 14-1 through 14-6 and HSLC 12 are coupled in common to a system bus 2 as are a central processor unit (CPU) 4, a random access memory (RAM) 8 and a read only memory (ROM) 10.

RAM 8 may store the operating system software, processor stack addresses and application programs. ROM 10 may store diagnostic programs for debugging system 1 as well as programs for initializing system 1 during the "Power On" sequence.

CPU 4 controls the operation by generating the system bus 2 timing cycles. The CPU 4 generates bus 2 cycle priorities. The RAM 8 chip refresh cycle has the highest priority. Next in priority is the bus 2 cycle called a DMA cycle for transferring information between RAM 8, ROM 10 or device controllers 14-1 through 14-4 and one of the device controllers 14-5 through 14-6 or HSLC 12. Following in priority is a screen refresh cycle for the CRT's of display 1 16-1 through display 16 16-16. The CPU 4 has the lowest bus 2 cycle priority. The CPU 4 is also responsive to instructions received from RAM 8 or ROM 10 for typically controlling the system 1 operation including branching to error routines, processing interrupts, and performing diagnostic routines as well as application programs.

Figure 2:
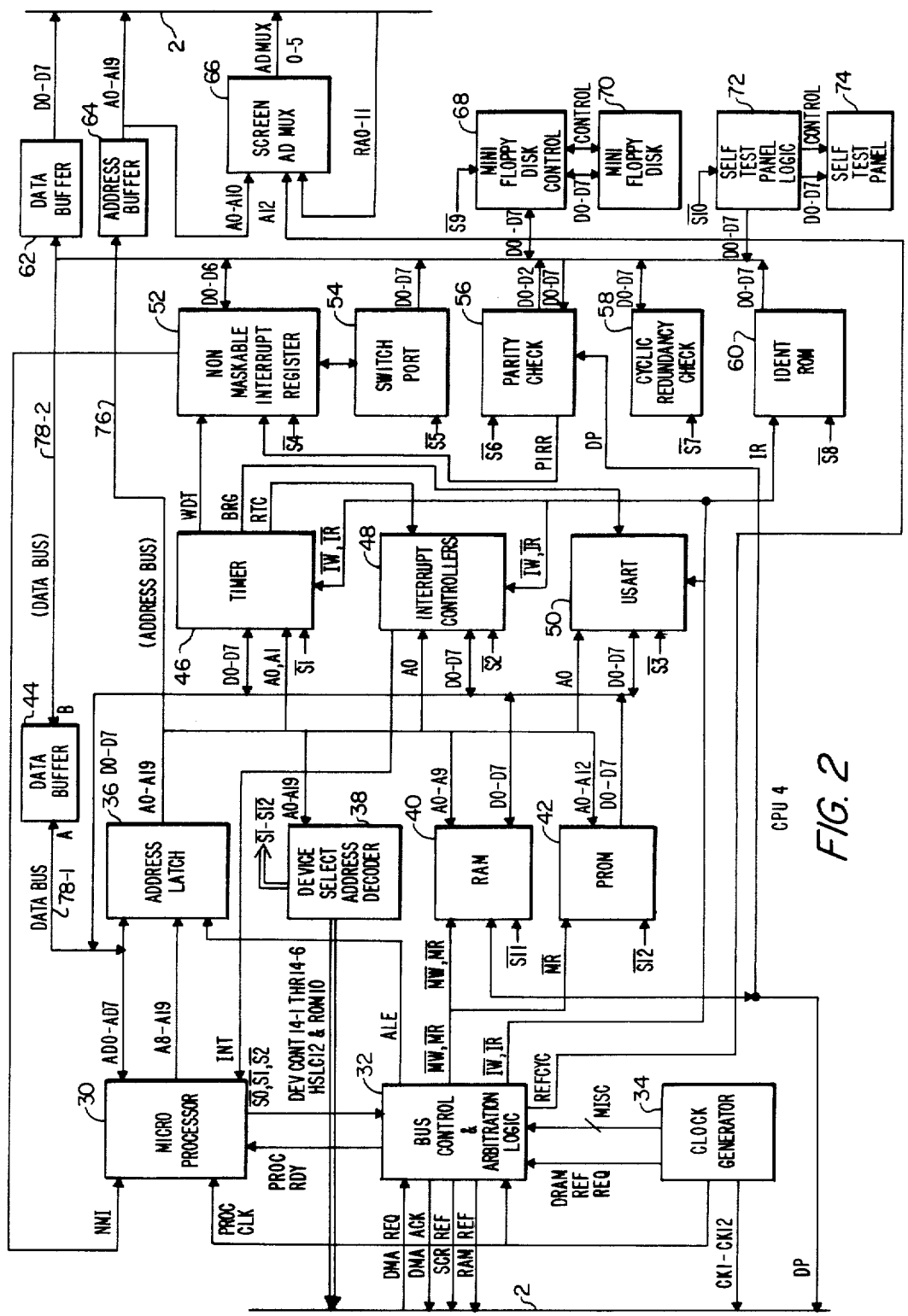
FIG. 2 shows a block diagram of the central processor unit of the interactive terminal system.

Referring to FIG. 2, the CPU 2 includes an Intel 8088 microprocessor 30 which generates 20-bit address signals AD0 through AD7 and A8 through A19 during address cycle time. The signals AD0 through AD7 (D0–D7) are operative as bidirectional data signals during data cycle time. Address signals AD0 through AD7 and A8 through A19 are stored in an address latch 36 gated by an address latch enable signal ALE generated by a bus control and arbitration logic 32. This allows the signals AD0 through AD7 to transfer data during data cycle time. The address signals A0–A19 from address latch 36 are transferred over address bus 76 to an address buffer 64 for transfer over system bus 2. Bidirectional data signals AD0 through AD7 appear on data bus 78-1 and/or data bus 78-2 as signals D0 through D7 at data cycle time.

A clock generator 34 generates the basic timing for system 1 by making sequential clock signals CK1 through CK12 available on system bus 2. A processor clock signal PROC CLK provides the basic timing for the microprocessor 30 and a bus control and arbitration logic 32. The PROC CLK signal is high between CK3 and CK5 time and between CK9 and CK11 time. Clock generator 34 also provides the RAM 8 refresh timing signal DRAM REF REQ. This results in the bus control and arbitration logic 32 to generate the RAM REF signal onto system bus 2 to refresh RAM 8. Also, a number of miscellaneous timing signals generated from clock signals CK1 through CK12 are applied to bus control and arbitration logic 32.

The bus control and arbitration logic 32 receives processor status signals $\overline{S0}$, $\overline{S1}$ and $\overline{S2}$ to indicate the mode of operation such as I/O read, I/O write, memory read, and memory write. The I/O operations refer to the microprocessor 30 communicating with one of the device controllers 14-1 through 14-6 or the HSLC 12 as well as all I/O operations within the CPU 4. The memory read or memory write operation refers to the transfer of information between the microprocessor 30 and either RAM 8, ROM 10, RAM 40 or PROM 42. Signal $\overline{MR}$ indicates a memory read out from RAM 40 or PROM 42 and signal $\overline{MW}$ indicates a memory write. Signal $\overline{IW}$ indicates an I/O write and signal $\overline{IR}$ indicates an I/O read operation. The processor ready signal PROC RDY indicates that the system bus 2 is busy and the microprocessor 30 should wait for the next nonbusy system bus 2 cycle. This will normally happen when the microprocessor 30 initiates a memory read, write or I/O cycle on system bus 2 since the memory cycle has a 2 CPU cycle duration. The address latch enable signal ALE as described supra gates the address signals AD0 through AD7 and A8 through A19 into the address latch 36.

The bus control and arbitration logic 32 responds to a device controller request signal DMA REQ with a device controller acknowledge signal DMA ACK indicating that the requesting device controllers 14-5, 14-6 or the HSLC 12 may communicate with RAM 8 or ROM 10 during a DMA bus 2 cycle. Also, screen refresh signal SCR REF indicates a display 1 16-1 through display 16 16-16 refresh cycle and RAM refresh signal RAM REF indicates a RAM 8 refresh cycle.

A device select address decoder 38 generates enable signals $\overline{S1}$ through $\overline{S12}$ in response to address signals A0 through A19 to enable 1 of 12 logic elements of CPU 4. The device select address decoder 38 also generates signal enable device controllers 14-1 through 14-6, HSLC 12 and ROM 10. One of the enable signals and the write signal $\overline{MW}$ or $\overline{IW}$ applied to a logic element will result the enabled logic element receiving a data byte via data bus 78-1 or 78-2 signals AD0 through AD7. If the read signal $\overline{RD}$ is applied to the enabled logic element, then the data bus 78-1 or 78-2 signals AD0 through AD7 (D0–D7) are stored in the enabled logic element.

A timer 46 acts as a watchdog timer, a real time clock, and a baud rate generator. A watchdog timer generates a signal WDT whenever an event that should have happened did not happen. A real time clock generates a signal RTC whenever the system desires an operation after a preset time. Signal BRG is applied to a USART 50 to generate the baud rate. Signal WDT is applied to a nonmaskable interrupt register which generates an NMI signal. The microprocessor is responsive to the NMI signal and branches to a firmware or software routine to recover from the fault that resulted in the WDT signal. The real time clock signal RTC is applied to interrupt controllers 48 which generates the INT signal which interrupts microprocessor 30. Microprocessor 30 enables interrupt controllers 48 via device select address decoder 38 and signal $\overline{S2}$ to read the data byte onto data bus 78-1 to identify the interrupting device to branch to the subroutine that will process that interrupt. Address signals A0 and A1 select the mode of operation of timer, the baud rate generator, watchdog timer, or real time clock. Data bus 78-1 signals D0 through D7 set or read the count in the timer 46.

The interrupt controllers 48 has 16 levels of interrupt level 1 having the highest priority interrupt and level 16 having the lowest level of interrupt. Address signal A0 indicates that an interrupt is requested when the enabling signal $\overline{S2}$ is present.

The universal synchronous/asynchronous receive transmit controller (USART) 50 is capable of controlling communication lines which are coupled directly to the USART 50. Signal $\overline{S3}$ enables the USART 50 which transmits data received from data bus 78-1 signals AD0 through AD7, and receives data which it transfers to data bus 78-1 signals AD0 through AD7. The baud rate is generated by timer 46 and applied to USART 50 by signal BRG.

A 1K×9 RAM 40 stores the interrupt vectors. Four 8-bit bytes are reserved for each of the 16 interrupt levels to point to the program to process the interrupt. The program may be stored in RAM 40 or in RAM 8. Address signals A0 through A9 address the 1024 byte locations.

A PROM 42 optional from 8K to 32K bytes may store the routines to initialize the CPU 4 during "Power Up". This loads RAM 40, interrupt controllers 48 and timer 46.

An address buffer 64 buffers the address signals A0 through A19 for transfer over system bus 2. The address buffer 64 is deactivated during the DMA system bus 2 cycle when one of the device controllers 14-5, 14-6 or the HSLC 12 is communicating with RAM 8, ROM 10 or device controllers 14-1 through 14-4 since the device controllers 14-1 through 14-6 or the HSLC 12 is generating the RAM 8, ROM 10 or device controllers 14-1 through 14-4 address.

Screen AD MUX 66 is a multiplexer which selects either the address signals A0 through A10 and A12 or refresh address signals RA0 through RA11 from screen refresh memory (not shown) to generate refresh address signals ADMUX 0 through ADMUX 5 which are used to access and refresh the screen refresh memory. The screen refresh memory refreshes display 1 16-1 through display 16 16-16.

The nonmaskable interrupt register generates the NMI signal to interrupt the microprocessor 30 during power failure, the sensing of a parity error signal PERR from parity check 56, in addition to the to the watchdog timer error described supra.

Switch port 54 contains switches for inputting miscellaneous signals including instructions for testing various CPU 4 functions and registers for storing addresses or configuration data during particular applications.

Parity check 56 receives data bus 78-2 signals D0 through D7 and DP, generates parity or checks for a parity error and indicates by data signals D0 through D2 if the parity error is a CPU 4 error or a DMA error. Parity bit DP is stored in RAM 40, RAM 8 and device controllers 14-1 through 14-4.

A cyclic redundancy check 58 is operative with USART 50 to generate during the transmit operation or to verify during the receive operation the cyclic redundancy check character.

An identification ROM 60 may store an identification number to identify the interactive terminal system 1. This is particularly needed when system 1 is part of a large communication system and assures the sending device that the addressed system 1 responded.

A self test panel 74 containing test light emitting diodes (LEDS), communication LEDS or a test switch is coupled to the data bus 78-2 via self test panel logic to manipulate the CPU 4 manually.

A mini floppy disk 70 is coupled to the data bus 78-2 via a mini floppy disk control 68 to store additional programs or to store a record of all transactions processed by the CPU 4.

Figure 3:
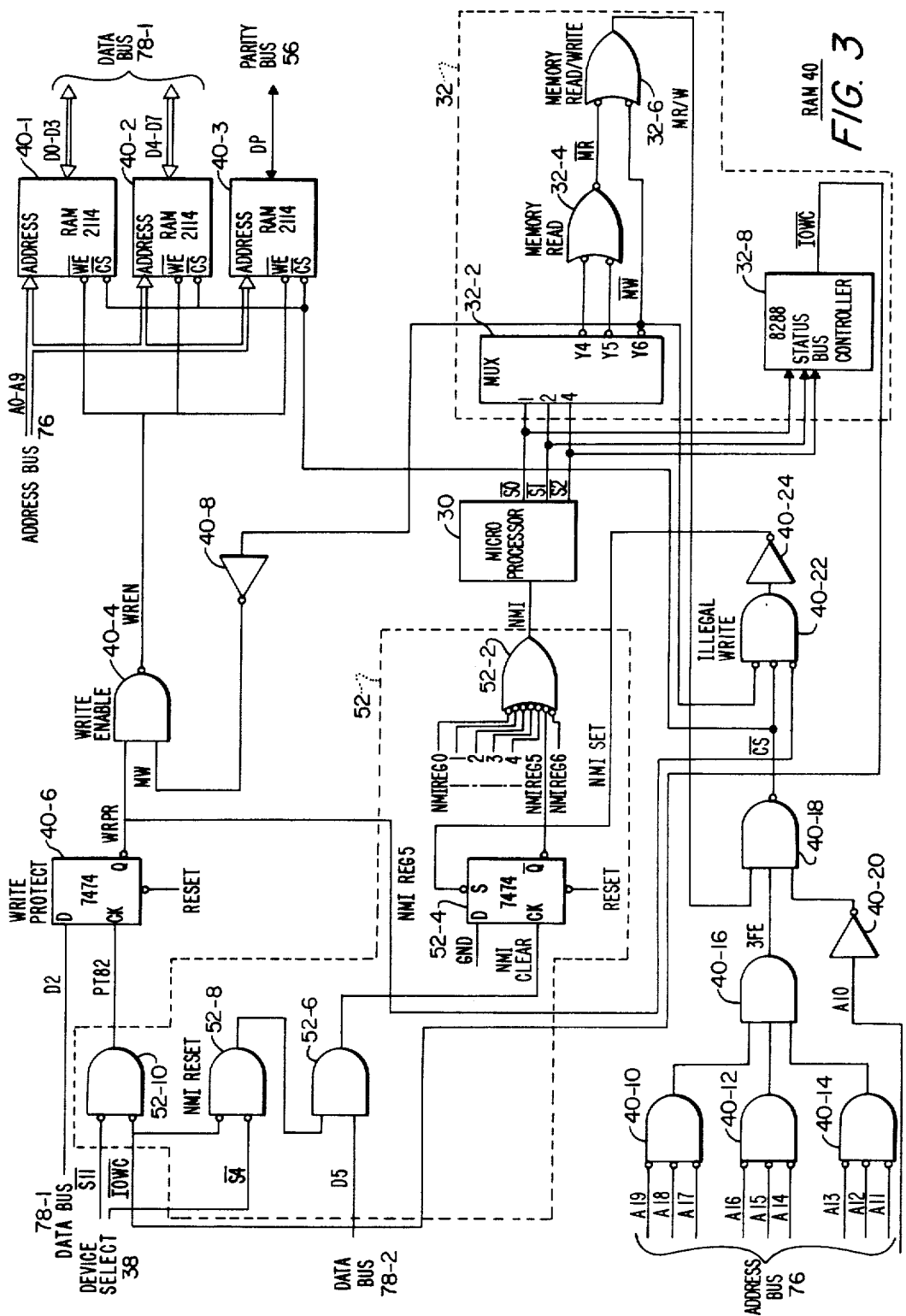
FIG. 3 is a detailed diagram of the write protect and nonmaskable interrupt logic.

Referring to FIG. 3, random access memories (RAM's) 40-1, 40-2 and 40-3 have 1024 address locations by 4 bits per address location. They are 2114 memory chips described in the "Intel Component Data Catalog", published 1979, by Intel Corporation, 3065 Bowers Avenue, Santa Clara, Calif. 95051.

Address signals A0 through A9 from address bus 76 of FIG. 2 applied to RAM's 40-1, 40-2 and 40-3 may address one of 1024 address locations and if the chip select terminals $\overline{CS}$ are at logical ZERO and the write enable terminals $\overline{WE}$ are at logical ONE read out on data bus 78-1, data signals D0 through D3 from RAM 40-1, D4 through D7 from RAM 40-2, and data parity bit DP from RAM 40-3. When both the chip select terminals ($\overline{CS}$) and the write enable terminals ($\overline{WE}$) of RAM's 40-1, 40-2 and 40-3 are at logical ZERO, then information from data bus 78-1 signals D0 through D7 and the parity bit DP from parity check 56 are written into an address location specified by address signals A0 through A9.

There is a requirement for loading RAM's 40-1, 40-2 and 40-3 with information and then setting the CPU 4 into a write protect mode. This prevents any write operation into RAM's 40-1, 40-2 and 40-3 while CPU 4 remains in the write protect mode.

CPU 4 remains in the write protect mode as long as a 74LS74 write protect flop 40-6 is set. The microprocessor 30 status signals $\overline{S0}$, $\overline{S1}$ and $\overline{S2}$ applied to an Intel 8288 bus controller generate an I/O write command signal $\overline{IOWC}$ which is applied to a NAND gate 52-10 of NMI maskable interrupt register 52. Signal $\overline{S11}$ is applied to the other terminal of NAND gate 52-10. Signal $\overline{S11}$ is generated by address signals A0 through A19 applied to device select address decoder 38 as indicated by the following boolean expression:

$$\overline{S11} = \overline{A0} \cdot A1 \cdot \overline{A2} \cdot \overline{A3} \cdot \overline{A4} \cdot \overline{A5} \cdot \overline{A6} \cdot A7 \cdot \overline{A8} \cdot \overline{A9} \cdot \overline{A10} \cdot \overline{A11} \cdot \overline{A12} \cdot \overline{A13} \cdot \overline{A14} \cdot \overline{A15} \cdot \overline{A16} \cdot \overline{A17} \cdot \overline{A18} \cdot \overline{A19}$$

Clock signal PT82, the output of NAND gate 52-10, rises with signals $\overline{S11}$ and $\overline{IOWC}$ go low. This sets flop 40-6 if the data bus 78-1 signal D2 is high, that is microprocessor 30 generated the hexadecimal address on address bus 76 as 00084 and the data byte on data bus 78-1 as XXXX X1XX. (A19 is the most significant bit.)

As long as the write protect flop 40-6 is set, output signal WRPR applied to a write enable NAND gate 40-4 and an illegal write gate 40-22 is low. Assume an illegal memory write operation into RAM's 40-1, 40-2 and 40-3 is initiated. Microprocessor 30 generates status signals $\overline{S0}$, $\overline{S1}$ and $\overline{S2}$ which are applied to a 74S138 multiplexer (MUX) 32-2 forcing output signal $\overline{MW}$ from terminal Y6 low. Signal $\overline{MW}$ is applied to an inverter 40-8 which forces signal MW high. A write enable NAND gate 40-4 would normally enable RAM's 40-1, 40-2 and 40-3 to perform a write operation when signal MW is high by forcing the write enable signal WREN low. However, the write protect flop 40-6 set forces the write protect signal WRPR low and the write enable signal WREN high preventing the write operation.

An indication is given to the microprocessor 30 that an illegal memory write operation was called for by generating a nonmaskable interrupt in the microprocessor 30. This will allow the microprocessor 30 to branch to a corrective routine which will allow the system 1 to recover from the illegal memory write request.

Address signals A0 through A19 address RAM 40, PROM 42, RAM 8 and ROM 10. Hexadecimal address locations 00000 through 003FF address the 1024 locations in RAM 40. Address signals A11 through A19 applied to NAND gates 40-10, 40-12 and 40-14 are therefore low, forcing the outputs of NAND gates 40-10, 40-12 and 40-14 high. This forces signal 3FE, the output of an AND gate 40-16, high. Also, signal A10 is low and is applied to an inverter 40-20 which applies a high signal to a NAND gate 40-18.

For a memory read operation, microprocessor 30 selects terminal Y4 or Y5 of MUX 32-2 and the output signals, forcing the output of a memory read negative OR gate 32-4, signal $\overline{MR}$, low. For a memory write operation, signal $\overline{MW}$ was forced low. In either case, the output of a memory read/write NOR gate 32-6, signal MR/W, is forced high and applied to NAND gate 40-18. The three inputs to NAND gate 40-18 high indicates that a memory read or write operation is called for in RAM's 40-1, 40-2 and 40-3 by forcing the chip select signal $\overline{CS}$ low. However, the write protect signal WRPR, the memory write signal $\overline{MW}$ and the chip select signal $\overline{CS}$ are applied to an illegal write NAND gate 40-22. Since the three signals are low, the output of NAND gate 40-22 is high, the output signal NMISET of an inverter 40-24 is low, and an NMI REG5 flop 52-4 is set. Flop 52-4 is a 74S74 circuit and is set when the S terminal is forced low. Setting flop 52-4 forces output signal NMI REG5 low and nonmask interrupt signal NMI, the output of a NOR gate 52-2, high. Microprocessor 30 is responsive to signal NMI to branch to a recovery routine.

During the processing of the recovery routine, the NMI REG5 flop 52-4 is reset by microprocessor 30 generating a hexadecimal address 0008C, a data byte XX1X XXXX, and signal $\overline{IOWC}$ via signals $\overline{S0}$, $\overline{S1}$ and $\overline{S2}$. Signal $\overline{S4}$ from device select address decoder 38 is generated when $0008C_{16}$ appears on address bus 76 address signals A0 through A19 and is applied to an NMI RESET NAND gate 52-8. Signal $\overline{IOWC}$ is generated as described supra and applied to the other input terminals of NAND gate 52-8. The output signal is applied to an AND gate 52-6. When the data bus 78-2 signal D5 applied to AND gate 52-6 goes high, the output NMI CLEAR signal is forced high, resetting the NMI REG5 flop 52-4.

Microprocessor 30 may take RAM 40 out of the write protect mode by resetting the write protect flop 40-6. In this case, output signal PT82 from NAND gate 52-10 rises as described supra with data bus 78-1 signal D2 low, resetting flop 40-6. With the write protect signal WRPR high, the write enable signal WREN from NAND gate 40-4 is controlled by the memory write signal MW. Also, signal WRPR high applied to NAND gate 40-22 keeps signal NMI SET high, preventing the NMI REG5 flop from setting. Note that NOR gate 52-2 has 6 inputs NMI REG1 through NMI REG6, indicating 6 conditions requesting a nonmaskable interrupt, only one of which is described in this specification.

Both the Intel 8088 microprocessor and the 8288 bus controller are described in "The 8086 Family Users' Manual, October 1979", published by Intel Corporation, 3065 Bowers Avenue, Santa Clara, Calif. 95051.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A central processor unit (CPU) including a memory and a microprocessor, said CPU being operative in a write enable mode for writing information into said memory, and further being operative in a write protect mode to cause said microprocessor to branch to a correction microprogram in response to a write memory command generated by said microprocessor, said CPU comprising:

microprocessor means for generating a plurality of address signals on an address bus, generating a plurality of data signals on a data bus and generating a plurality of bus cycle signals;

write protect means responsive to the plurality of address signals in a first state, a first of the plurality of data signals in a first state, and a first bus cycle signal for generating a first signal in a first state indicative of said write protect mode, said write protect means being responsive to the plurality of address signals in the first state, the first of the plurality of data signals in a second state, and the first bus cycle signal for generating the first signal in a second state, said write protect means being further responsive to the first signal in the first state and a second bus cycle signal for generating a second signal indicative of said memory write mode;

memory means responsive to the second bus cycle signal, the second signal for writing a data word representative of the plurality of data signals received from said data bus at an address location of said memory specified by the plurality of address signals in a second state; and nonmaskable interrupt means responsive to the first signal and the second bus cycle signal for generating a third signal for causing said microprocessor means to interrupt a current microprogram to branch to the correction microprogram, wherein said microprocessor means includes,
        said microprocessor for generating a plurality of command signals to identify the type of bus cycle that said CPU is starting to execute;
        a multiplexer responsive to the plurality of command signals in a first state for generating the second bus cycle signal; and
        a bus controller responsive to the plurality of command signals in a second state for generating the first bus cycle signal.

2. The central processor unit of claim 1 wherein said write protect means comprises:

a negative AND gate responsive to the first bus cycle signal and the plurality of address signals in the first state for generating a clock signal;

a first bistable element responsive to the first of the plurality of data signals in the first state and the rise of the clock signal to force said first bistable element into a first state and generating the first signal in a first state for indicating said write protect mode, said first bistable element responsive to the first of the plurality of data signals in the second state and the rise of the clock signal to force said first bistable element into a second state and generating the first signal in a second state; and a NAND gate responsive to the first signal in the second state and the second bus cycle signal for generating the second signal.

3. The central processor unit of claim 2 wherein said nonmaskable interrupt means comprises:

logic means responsive to the plurality of address signals in the second state, the second bus cycle signal and the first signal in the first state for generating a fourth signal; and a second bistable element responsive to the third signal for generating the third signal.

* * * * *